under the United States Patent Office

2,915,508
Patented Dec. 1, 1959

2,915,508

COPOLYMERS OF FLUORINATED DIENES

Archibald N. Bolstad, Maplewood, N.J., and John M. Hoyt, Woodside, N.Y., assignors, by mesne assignments, to Minnesota Mining and Manufacturing Company, St. Paul, Minn., a corporation of Delaware No Drawing. Application July 1, 1955
Serial No. 519,653

13 Claims. (Cl. 260—87.5)

This invention relates to halogen-containing copolymers. In one aspect, the invention relates to fluorine-containing copolymers. More particularly, in this aspect, the invention relates to fluorine-containing elastomeric copolymers and the method for their manufacture.

Fluorine-containing copolymers have been found to possess many useful applications by virtue of their relative chemical inertness and high physical strength and solvent-resistance. Because of these properties, such fluorine-containing copolymers can be fabricated into a wide variety of useful articles having improved chemical and physical stability. In this respect, it is also desirable that these fluorine-containing copolymers, in addition to the aforementioned characteristics, also possess elastomeric properties so that a high degree of flexibility, elasticity and extensibility is obtained, and which can be easily vulcanized and processed.

It is, therefore, an object of this invention to provide new and useful fluorine-containing copolymers having desirable chemical and physical characteristics.

Another object of the invention is to provide new and useful fluorine-containing elastomeric copolymers, having the aforementioned characteristics, which can be easily fabricated into a wide variety of useful articles of improved chemical and physical stability.

Still another object of the invention is to provide a method for the preparation of the aforementioned elastomeric fluorine-containing copolymers.

Various other objects and advantages inherent in the present invention will become apparent to those skilled in the art from the accompanying description and disclosure.

The copolymers of the present invention are elastomeric copolymers of a polymerizable diene, particularly branched polymerizable dienes, containing at least one hydrogen atom and a terminal carbon atom having two fluorine substituents, and another different polymerizable diene having at least one fluorine substituent. In general, as more fully hereinafter disclosed, these copolymers are prepared by copolymerizing the aforementioned polymerizable dienes containing at least one hydrogen atom and a terminal carbon atom having two fluorine substituents, and the other different polymerizable diene having at least one fluorine substituent, in the presence of a polymerization catalyst at temperatures between about 0° C. and about 90° C., and preferably at a temperature between about 25° C. and about 50° C. The copolymers thus obtained are valuable macromolecules which are adaptable to a number of commercial uses, having characteristics comparable to natural rubber gum-stocks, and solvent-swell characteristics comparable to fluorine-containing rubbers. In addition, they possess low temperature flexibility, elasticity and resiliency, and can be easily vulcanized and processed. These copolymers are chemically and thermally stable, resistant to oil and hydrocarbon-fuels, selectively soluble in various organic solvents, and can be molded by conventional techniques to yield a wide variety of useful articles. They are also useful as durable, flexible, protective coatings on surfaces which are subjected to environmental conditions in which they may come into contact with various corrosive substances, such as oils, fuels and strong chemical reagents.

As indicated above, the polymerizable diene, which is preferably a branched diene, containing at least one hydrogen atom and a terminal carbon atom having two fluorine substituents, is polymerized with another polymerizable diene having at least one fluorine substituent. Examples of the first-mentioned polymerizable diene are 1,1-difluorobutadiene; 1,1,3-trifluoro-2-methyl butadiene; perfluorobutadiene; 1,1,2-trifluorobutadiene; 1,1,2,4,4-pentafluorobutadiene; 1,1-difluoro-3-methyl butadiene; 1,1-difluoro-2-methyl butadiene; 5,5,5-trifluoropentadiene-1,3; 1,1,2,4,4-pentafluoro-3-methyl butadiene; and 1,1,2,4-tetrafluorobutadiene. Examples of the second-mentioned other different polymerizable diene are 1,1-difluoro-2-methyl butadiene; 1,1-difluoro-3-methyl butadiene; 1,1,3-trifluoro-2-methyl butadiene; fluoroprene; 1,1-difluorobutadiene; and 1,1,2-trifluoropentadiene-1,4.

The most useful elastomeric copolymers produced in accordance with this invention contain between about 5 mol percent and about 95 mol percent of any of the aforementioned polymerizable dienes and the remaining major constituent being any of the aforementioned other different polymerizable dienes. Copolymers containing between about 25 mol percent and about 75 mol percent of one of the above dienes are preferred.

The elastomeric copolymers of this invention are preferably prepared by employing a peroxy type catalyst containing the O—O linkage, in either a water-emulsion type recipe or as an organic peroxide promoter in a bulk-type polymerization system. The water-emulsion type recipe system is preferred. The peroxy compound present in these water-emulsion or bulk-type recipes functions as an oxidant. This oxidant is preferably an inorganic persulfate, such as potassium persulfate, sodium persulfate or ammonium persulfate. There is also present in the water-emulsion type recipes, a reductant which is preferably in the form of a bisulfite, such as potassium bisulfite, sodium bisulfite, potassium metabisulfite, or sodium metabisulfite. The oxidant comprises between about 0.1 to about 5 parts by weight per 100 parts of total monomers present. The reductant, for example, sodium metabisulfite, comprises between about 0.05 and about 5 parts by weight per 100 parts of total monomers present, and preferably comprises between about 0.1 and about 2 parts by weight per 100 parts of total monomers present. It has been found that the presence of such materials as borax along with the oxidant and the reductant is beneficial in these water-emulsion type recipes in aiding in the maintenance of optimum pH conditions.

The emulsifying agent, employed in the above-mentioned water-emulsion type recipe systems, is present either in the form of an aliphatic acid metal salt, having from 14 to 20 carbon atoms per molecule or in the form of a halogenated organic acid having from 6 to 18 carbon atoms per molecule. A typical example of these emulsifying agents is potassium stearate (KORR soap). Typical examples of halogenated organic acids serving as emulsifying agents in the above-mentioned recipes are salts derived from fluorocarboxylic acids (e.g., perfluorooctanoic acid) or perfluorochlorocarboxylic acids (e.g., trifluorochloroethylene telomer acid soaps). The fluorocarboxylic acid salts which may be employed are those disclosed in U.S. Patent No. 2,559,752, and the non-acidic derivatives of the acids disclosed therein as being effective dispersing agents in polymerization reactions which may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents comprise between about 0.5 and about 10 parts by weight per 100 parts of total monomers present.

The emulsion polymerization is preferably conducted under alkaline conditions. It is desirable in these emulsion polymerization systems that the pH be maintained within the limits of between about 7 and 11, in order to prevent gelling of the emulsifying agents, a condition which often causes slow-down or stoppage of the polymerization reaction. In this respect, it should be noted that it is sometimes necessary to maintain the pH of the system between the aforementioned pH limits by the addition of suitable buffering agents. Typical examples are sodium borate and disodium phosphate.

As indicated above, the polymerization reactions may also be carried out in which the catalyst is present in the form of an organic peroxide promoter in a bulk-type polymerization system. Of these organic peroxide promoters, halogen-substituted acetyl peroxides are preferably employed. A preferred promoter of this type is trichloroacetyl peroxide. Other halogen-substituted organic peroxides which are suitable for carrying out the copolymerization are trifluorodichloropropionyl peroxide, trifluoroacetyl peroxide, difluoroacetyl peroxide, 2,4-dichlorobenzoyl peroxide, chloroacetyl peroxide, dichlorofluoroacetyl peroxide. The copolymerizations described herein to produce the copolymers of the present invention are carried out under autogenous conditions of pressure. In general, these pressures do not rise above approximately 500 pounds per square inch.

As previously indicated, the elastomeric copolymers of the present invention are particularly suitable and useful for the fabrication of a wide variety of rubber-like materials having highly desirable chemical and physical properties. In this respect, the copolymers of the present invention possess important utility in the manufacture of protective articles of clothing, such as boots, suits, gloves, belts and in the fabrication of resilient gaskets, seals, pump and valve-diaphragms, films and other commerical applications.

Another important use of the copolymers of the present invention is in the form of durable, flexible coatings to fabric surfaces. For this purpose, the polymers of this invention may be dissolved in various commercial solvents. Particularly useful solvents comprises the aliphatic and aromatic esters, either alcohols, ketones and halogenated hydrocarbons. Typical examples of these solvents are di-isobutyl ketone, methyl ethyl ketone, methyl isobutyl ketone, ethyl acetate and 1,1,3-trifluorotrichloroethane. In this respect, it is often desirable to reduce the molecular weight of the copolymers of this invention in order to obtain greater solubility in organic solvents. This is of importance in order to vary the softness of the copolymer for easier processability in subsequent molding operations. Reduction of the strength of the recipe of the polymerization catalyst merely slows the rate of reaction without affecting appreciably the molecular weight of the finished copolymer. It is found, however, that the addition of various polymerization modifiers appreciably reduces the molecular weight of the copolymeric products and increases their solubility and ease of processability without affecting, unduly, the overall yield. Suitable polymerization modifiers include chloroform ($CHCl_3$), Freon-113 ($CF_2ClCFCl_2$) carbon tetrachloride ($CCl_4$), trichloroacetyl chloride ($CCl_3COCl$), bromotrichloroethane ($CBrCl_3$), and dodecyl mercaptan ($C_{12}H_{25}SH$). These modifiers are preferably added in amounts between about 0.01 to about 10 parts by weight per 100 parts of total monomers charged to the polymerization reaction. Dodecyl mercaptan is preferred.

The following examples are offered for a better understanding of the present invention and are not to be construed as limiting its scope.

*Example I*

This example illustrates the copolymerization of 1,1-difluorobutadiene and 1,1-difluoro-2-methyl butadiene to produce an elastomeric copolymer.

A heavy-walled glass polymerization tube was flushed with nitrogen and was then charged with 7 cc. of an aqueous solution containing 0.75 gram of dissolved potassium $C_8$-telomerate, $Cl(CF_2CFCl)CF_2COOK$, as an emulsifier dissolved in 150 ml. of water, and having a pH of 9.5. The contents of the tube were frozen solid in a liquid nitrogen freezing bath. After the contents of the tube were frozen solid, the tube was charged with 3 cc. of an aqueous solution containing 1.0 gram of potassium persulfate dissolved in 60 cc. of water, the pH of the system thereby becoming 7.0. The contents of the tube were then refrozen, and the tube was connected to a gas-transfer system and evacuated at liquid nitrogen temperature. Thereafter, 2.32 grams of 1,1-difluorobutadiene and 2.68 grams of 1,1-difluoro-2-methyl butadiene were distilled into the tube to make up a total monomer charge comprising 50 mol percent of each monomer. The 1,1-difluoro-2-methyl butadiene is prepared as follows:

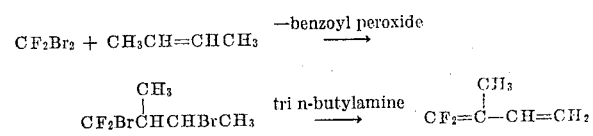

The polymerization tube was then sealed and rotated end-over-end in a temperature-regulated water-bath at 50° C. The polymerization was conducted under autogenous pressure at 50° C. for a period of 24 hours. The polymer latex thus obtained was coagulated by freezing at liquid nitrogen temperature. The coagulated product was collected, washed with hot water, and dried to constant weight in vacuo at 35° C. A rubbery product was obtained which was found, upon analysis, to comprise approximately 47.5 mol percent of 1,1-difluorobutadiene and the remaining major constituent being 1,1-difluoro-2-methyl butadiene. The copolymer was obtained in an amount corresponding to an 18% conversion.

*Example II*

This example illustrates the copolymerization of 1,1,2-trifluorobutadiene and 1,1-difluoro-2-methyl butadiene to produce an elastomeric copolymer.

Employing the procedure set forth in Example I and the same emulsion catalyst system, the tube was charged with 3.78 grams of 1,1,2-trifluorobutadiene and 1.22 grams of 1,1-difluoro-2-methyl butadiene to make up a total monomer charge comprising 80 mol percent of 1,1,2-trifluorobutadiene and 20 mol percent of 1,1-difluoro-2-methyl butadiene. The copolymerization reaction was carried out under autogenous conditions of pressure at a temperature of 50° C. for a period of 24 hours. The resultant elastomeric product was worked-up in accordance with the same procedure as set forth in Example I. A rubbery product was obtained and, upon analysis, was found to comprise approximately 95 mol percent of 1,1,2-trifluorobutadiene and the remaining major constituent being 1,1-difluoro-2-methyl butadiene. The copolymer was obtained in an amount corresponding to a 58.9% conversion.

A sample of the raw copolymer was compression molded at 250° F. for 5 minutes. After molding, the sample remained rubbery. A volume increase of 37.2% was obtained in ASTM type II fuel, ASTM designation D-471-49T, which consisted of isooctane (60% by volume), benzene (5% by volume), toluene (20% by volume), and xylene (15% by volume). The Gehman stiffness data was as follows: $T_2 = -16°$ C.; $T_5 = -29°$ C.; $T_{10} = -34°$ C.; $T_{100} = -48.5°$ C.

Example III

This example illustrates the copolymerization of perfluorobutadiene and 1,1-difluoro-3-methyl butadiene to produce an elastomeric copolymer.

A heavy-walled glass polymerization tube was flushed with nitrogen and was then charged with 6 ml. of a soap solution (pH 10.2) containing 5.0 grams of potassium stearate (KORR soap) and 0.3 gram dodecyl mercaptan dissolved in 120 ml. of water; and then with 4 ml. of a catalyst solution comprising 0.3 gram of potassium persulfate dissolved in 80 ml. of water. After the contents of the tube were frozen solid, it was connected to a gas-transfer system and evacuated at liquid nitrogen temperature. To the frozen contents of the tube were added, by distillation, 2.72 grams of perfluorobutadiene and 2.28 grams of 1,1-difluoro-3-methyl butadiene, to make up a total monomer charge containing 50 mol percent of each one of them. The 1,1-difluoro-3-methyl butadiene was prepared by adding dibromodifluoromethane to isobutene to produce an adduct,

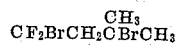

which was then dehydrobrominated at about 150° C. in the presence of tri-n-butyl amine to yield

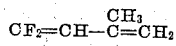

B.P. 34° C.–35.5° C.

The polymerization tube was next sealed and rotated end-over-end in a temperature-regulated water-bath at 50° C. The polymerization was conducted under autogenous pressure for a period of 22 hours. The polymer latex thus obtained was coagulated by freezing at liquid nitrogen temperature. The coagulated product was collected, washed with hot water and dried to constant weight in vacuo at 35° C. An elastomeric rubbery product was obtained which was found upon analysis, to comprise approximately 14 mol percent of perfluorobutadiene and the remaining major constituent being 1,1-difluoro-3-methyl butadiene. The copolymer was obtained in an amount corresponding to a 46% conversion.

A sample of the raw copolymer was compression molded at 225° F. for 5 minutes. After molding, the sample remained soft and flexible. A volume increase of 114% was obtained in ASTM type II fuel. The Gehman stiffness data was as follows: $T_2=0°$ C.; $T_5=-10°$ C.; $T_{10}=-20°$ C.; $T_{100}=-28°$ C.

Example IV

This example illustrates the copolymerization of 1,1-difluoro-3-methyl butadiene and 1,1-difluorobutadiene to produce an elastomeric copolymer.

Employing the procedure set forth in Example III and the same emulsion catalyst system, the tube was charged with 2.68 grams of 1,1-difluoro-3-methyl butadiene and 2.32 grams of 1,1-difluorobutadiene to make up a total monomer charge comprising 50 mol percent of each monomer. The copolymerization reaction was carried out under autogenous conditions of pressure at a temperature of 50° C. for a period of 24 hours. The resultant elastomeric product was worked-up in accordance with the same procedure as set forth in Example III. A soft, rubbery product was obtained and, upon analysis, was found to comprise approximately 92 mol percent of 1,1-difluoro-3-methyl butadiene and the remaining major constituent being 1,1-difluorobutadiene. The copolymer was obtained in an amount corresponding to a 92% conversion.

A sample of the raw copolymer was compression molded at 300° F. for 5 minutes. After molding, the sample remained rubbery. A volume increase of 70% was obtained in ASTM type II fuel. The Gehman stiffness data was as follows: $T_2=-17°$ C.; $T_5=-26°$ C.; $T_{10}=-28°$ C.; $T_{100}=-32°$ C.

Example V

This example illustrates the copolymerization of 1,1-difluoro-2-methyl butadiene and 1,1-difluoro-3-methyl butadiene to produce an elastomeric copolymer.

Employing the procedure set forth in Example III and the same emulsion catalyst system, the tube was charged with 2.5 grams of 1,1-difluoro-2-methyl butadiene and 2.5 grams of 1,1-difluoro-3-methyl butadiene to make up the total monomer charge comprising 50 mol percent of each monomer. The copolymerization reaction was carried out under autogenous conditions of pressure at a temperature of 50° C. for a period of 24 hours. The resultant elastomeric product was worked-up in accordance with the same procedure as set forth in Example III. A rubbery product was obtained and, upon analysis, was found to comprise approximately 50 mol percent of 1,1-difluoro-2-methyl butadiene and the remaining major constituent being 1,1-difluoro-3-methyl butadiene. The copolymer was obtained in an amount corresponding to a 94% conversion.

A sample of the raw copolymer was compression molded at about 300° F. for 5 minutes. After molding, the sample remained rubbery. A volume increase of 84% in ASTM type II fuel was obtained. The Gehman stiffness data was as follows: $T_2=3.5°$ C.; $T_5=-9.5°$ C.; $T_{10}=-13.5°$ C.; $T_{100}=-22.5°$ C.

Example VI

This example illustrates the copolymerization of perfluorobutadiene and 1,1-difluoro-2-methyl butadiene to produce an elastomeric copolymer.

Employing the same procedure set forth in Example III and the same emulsion catalyst system, the tube was charged with 3.04 grams of perfluorobutadiene and 1.96 grams of 1,1-difluoro-2-methyl butadiene to make up a total monomer charge comprising 50 mol percent of each monomer. The copolymerization reaction was carried out under autogenous conditions of pressure at a temperature of 50° C. for a period of 24 hours. The resultant elastomeric product was worked-up in accordance with the same procedure as set forth in Example III. A rubbery product was obtained and, upon analysis, was found to comprise approximately 12 mol percent of perfluorobutadiene and the remaining major constituent being 1,1-difluoro-2-methyl butadiene. The copolymer was obtained in an amount corresponding to a 29% conversion.

Example VII

This example illustrates the copolymerization of 1,1,2,4-tetrafluorobutadiene and 1,1-difluoro-2-methyl butadiene to produce an elastomeric copolymer.

A heavy-walled glass polymerization tube was flushed with nitrogen and then charged with 1 ml. of a solution containing 0.4 gram of sodium metabisulfite dissolved in 20 ml. of water. The contents of the tube were then frozen and to the tube were added 7.5 ml. of a soap solution containing the potassium salt of perfluorooctanoic acid (0.75 gram) dissolved in 150 ml. of water. The pH of the resultant mixture was adjusted with potassium hydroxide to 7. The tube was then refrozen and to it was charged 1.5 ml. of a catalyst solution containing 1.0 gram of potassium persulfate dissolved in 30 ml. of water. The tube was then connected to a gas-transfer system and evacuated at liquid nitrogen temperature. To the frozen contents of the tube were added 2.74 grams of 1,1,2,4-tetrafluorobutadiene and 2.26 grams of 1,1-difluoro-2-methyl butadiene, which comprised a 50/50 molar ratio.

The polymerization tube was sealed and rotated end-over-end in a temperature-regulated water-bath at 50° C., under autogenous pressure for a period of 21 hours. At the end of this time, the contents of the tube were coagulated by freezing at liquid nitrogen temperature. The coagulated product was then removed from the tube, washed with hot water until entirely free of soap, and dried to constant weight in vacuo at 35° C. A rubbery copolymer was obtained and then found, upon analysis, to comprise approximately 38.5 mol percent 1,1,2,4-tetrafluorobutadiene and the remaining major constituent being 1,1-difluoro-2-methyl butadiene. The copolymer was obtained in an amount representing a 45% conversion.

*Example VIII*

This example illustrates the copolymerization of 1,1,3-trifluoro-2-methyl butadiene and 1,1-difluoro-3-methyl butadiene to produce an elastomeric copolymer.

A heavy-walled glass polymerization tube was flushed with nitrogen and was then charged with 9 ml. of a soap solution containing 6.0 grams of $C_7F_{15}$-COONH$_4$ as an emulsifier; 0.4 gram sodium metabisulfite; 7.5 grams borax; and 0.1 gram dodecyl mercaptan dissolved in 140 ml. of water. The tube was then placed in a liquid nitrogen freezing bath. The tube was then charged with 1 ml. of a catalyst solution comprising 1.0 gram potassium persulfate dissolved in 20 ml. of water. The contents of the tube were then refrozen and the tube was connected to a gas-transfer system and evacuated. To the frozen contents of the tube were added, by distillation, 2.7 grams 1,1,3-trifluoro-2-methyl butadiene and 2.3 grams of 1,1-difluoro-3-methyl butadiene to make up a total monomer charge comprising 50 mol percent of each monomer. The monomer 1,1,3-trifluoro-2-methyl butadiene was prepared as follows: Dibromodifluoromethane was added to 2-fluorobutene-2 to yield the adduct

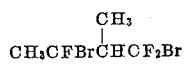

which was then dehydrobrominated at about 150° C. in the presence of tri-n-butyl amine to produce

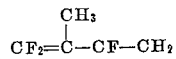

B.P. 48°–51.5° C.

The polymerization tube was next sealed and rotated end-over-end in a temperature-regulated water-bath at 50° C. under autogenous pressure for a period of 23 hours. The polymer latex thus obtained was coagulated by freezing at liquid nitrogen temperature. The coagulated product was collected, washed with hot water and dried to constant weight in vacuo at 35° C. A soft, flexible, rubbery product was found which was found, upon analysis, to comprise aproximately 45 mol percent of 1,1,3-trifluoro-2-methyl butadiene and the remaining major constituent being 1,1-difluoro-3-methyl butadiene. The copolymer was obtained in an amount corresponding to a 59% conversion.

A sample of the raw copolymer was compression molded at 200° F. for 5 minutes. After molding, the sample remained as a snappy rubber. A volume increase of 98.3% was obtained in ASTM type II fuel. The Gehman stiffness data was as follows:

$T_2=5°$ C.; $T_5=-4°$ C.; $T_{10}=-8.5°$ C.; $T_{100}=-16.5°$ C.

*Example I*

This example illustrates the copolymerization of perfluorobutadiene and 1,1-difluoro-3-methyl butadiene to produce an elastomeric copolymer.

Employing the procedure set forth in Example VIII and the same emulsion catalyst system, the tube was charged with 3.91 grams perfluorobutadiene and 1.09 grams 1,1-difluoro-3-methyl butadiene to make up a total monomer charge comprising 70 mol percent of perfluorobutadiene and 30 mol percent of 1,1-difluoro-3-methyl butadiene. The copolymerization reaction was carried out under autogenous conditions of pressure at a temperature of 50° C. for a period of 24 hours. The resultant elastomeric product was worked-up in accordance with the same procedure as set forth in Example VIII. A soft, flexible, rubbery product was obtained and, upon analysis, was found to comprise approximately 21 mol percent perfluorobutadiene and the remaining major constituent being 1,1-difluoro-3-methyl butadiene. The copolymer was obtained in an amount corresponding to a 23% conversion.

A sample of the raw copolymer was compression molded at 200° F. for 5 minutes. After molding, the sample remained rubbery. A volume increase of 104% was obtained in ASTM type II fuel. The sample remained flexible at a temperature of $-20.5°$ C.

*Example X*

Employing the same procedure set forth in Example VIII and the same emulsion catalyst system, the tube was charged with 4.66 grams of perfluorobutadiene and 0.34 gram of 1,1-difluoro-3-methyl butadiene to make up a total monomer charge comprising 90 mol percent of perfluorobutadiene and 10 mol percent of 1,1-difluoro-3-methyl butadiene. The copolymerization was carried out under autogenous conditions of pressure at a temperature of 50° C. for a period of 24 hours. The resultant elastomeric product was worked-up in accordance with the same procedure as set forth in Example VIII. A soft, rubbery product was obtained and, upon analysis, was found to comprise 30 mol percent of perfluorobutadiene and the remaining major constituent being 1,1-difluoro-3-methyl butadiene. The copolymer was obtained in an amount corresponding to a 5% conversion.

*Example XI*

This example illustrates the copolymerization of 1,1,2-trifluorobutadiene and 1,1,3-trifluoro-2-methyl butadiene to produce an elastomeric copolymer.

Employing the procedure set forth in Example VIII and the same emulsion catalyst system, the tube was charged with 2.35 grams of 1,1,2-trifluorobutadiene and 2.65 grams of 1,1,3-trifluoro-2-methyl butadiene to make up a total monomer charge comprising 50 mol percent of each monomer. The copolymerization reaction was carried out under autogenous conditions of pressure at a temperature of 50° C. for a period of 22 hours. The resultant elastomeric product was worked-up in accordance with the same procedure set forth in Example VIII. A snappy, rubbery product was obtained and, upon analysis, was found to comprise approximately 73 mol percent of 1,1,2-trifluorobutadiene and the remaining major constituent being 1,1,3-trifluoro-2-methyl butadiene. The copolymer was obtained in an amount corresponding to an 85% conversion.

A sample of the raw copolymer was compression molded at 350° F. for 5 minutes. After molding, the sample remained flexible. A volume increase of 45.5% was obtained in ASTM type II fuel.

*Example XII*

This example illustrates the copolymerization of 1,1,2,4,4-pentafluorobutadiene and 1,1,3-trifluoro-2-methyl butadiene to produce an elastomeric copolymer.

Employing the procedure set forth in Example VIII and the same emulsion catalyst system, the tube was charged with 2.7 grams of 1,1,2,4,4-pentafluorobutadiene and 2.3 grams of 1,1,3-trifluoro-2-methyl butadiene to make up a total monomer charge comprising 50 mol percent of each one of them. The copolymerization was carried out under autogenous conditions of pressure at a temperature of 50° C. for a period of 40 hours. The 1,1,2,4,4-pentafluorobutadiene was prepared as follows: 1 - chloro - 1,2 - dibromo - 1,2,2 -trifluoroethane, $CF_2BrCFClBr$, was added to vinylidene fluoride to yield $CF_2BrCFClCH_2CF_2Br$, which was then dehydrobrominated using potassium hydroxide, followed by debromochlorination using zinc to yield $CF_2=CF-CH=CF_2$, B.P. 15.0° C.–15.5° C.

The resultant elastomeric product from the above polymerization reaction was worked-up in accordance with the same procedure as set forth in Example VIII.

A rubbery product was obtained and, upon analysis, was found to comprise approximately 42.5 mol percent 1,1,2,4,4-pentafluorobutadiene and the remaining major constituent being 1,1,3-trifluoro-2-methyl butadiene. The copolymer was obtained in an amount corresponding to an 81% conversion.

Example XIII

This example illustrates the copolymerization of 1,1,3-trifluoro-2-methyl butadiene and fluoroprene to produce an elastomeric copolymer.

Employing the same procedure set forth in Example VIII and the same emulsion catalyst system, the tube was charged with 1.44 grams of 1,1,3-trifluoro-2-methyl butadiene and 3.56 grams of fluoroprene to make up a 20/80 monomer charge. The copolymerization reaction was carried out under autogenous conditions of pressure at a temperature of 50° C. and for a period of 24 hours. The resultant elastomeric product was worked-up in accordance with the same procedure as set forth in Example VIII. A rubbery product was obtained and, upon analysis, was found to comprise approximately 5 mol percent of 1,1,3-trifluoro-2-methyl butadiene and the remaining major constituent being fluoroprene. The copolymer was obtained in an amount corresponding to a 16% conversion.

Example XIV

This example illustrates the copolymerization of 5,5,5-trifluoropentadiene and 1,1-difluoro-3-methyl butadiene to produce an elastomeric copolymer.

A heavy-walled glass polymerization tube was flushed with nitrogen and then was charged with 5 ml. of a soap solution prepared by dissolving 2.5 grams of the ammonium salt of perfluorooctanoic acid and 0.15 gram of dodecyl mercaptan in 100 ml. of water; and then with 4 ml. of a catalyst solution comprising 0.3 gram of potassium persulfate dissolved in 80 ml. of water. To this mixture there was then added 1 ml. of a concentrated buffer solution of sodium diphosphate. The pH of the mixture was found to be 10. The tube was then placed in a liquid nitrogen freezing bath. After the contents of the tube were frozen solid, the tube was connected to a gas-transfer system and evacuated at liquid nitrogen temperature. To the frozen contents of the tube were added, by distillation, 2.7 grams of 5,5,5-trifluoropentadiene-1,3 and 2.3 grams of 1,1-difluoro-3-methyl butadiene to make up a total monomer charge comprising 50 mol percent of each monomer. The 5,5,5-trifluoro-1,3-pentadiene was obtained in accordance with the disclosure in the Journal of the American Chemical Society, vol. 76, p. 5147 (1954).

The polymerization tube was then sealed and rotated end-over-end in a temperature-regulated water-bath at 50° C. The copolymerization was conducted under autogenous pressure at 50° C. for a period of 24 hours. The polymer latex thus obtained was coagulated by freezing at liquid nitrogen temperature. The coagulated product was collected, washed with hot water and dried to constant weight in vacuo at 35° C. A soft, flexible, rubbery product was obtained and was found, upon analysis, to comprise approximately 50 mol percent of 5,5,5-trifluoropentadiene-1,3 and the remaining major constituent being 1,1-difluoro-3-methyl butadiene. The copolymer was obtained in an amount corresponding to a 92% conversion.

A sample of the raw copolymer was compression molded at 300° F. for 5 minutes. After molding, the sample remained rubbery. A volume increase of 107% was obtained in ASTM type II fuel. The Gehman stiffness data was as follows: $T_2=4.5°$ C.; $T_5=2°$ C.; $T_{10}=0°$ C.; $T_{100}=-3.4°$ C.

Example XV

This example illustrates the copolymerization of 5,5,5-trifluoropentadiene and 1,1-difluoro-2-methyl butadiene to produce an elastomeric copolymer.

Employing the procedure set forth in Example XIV and the same emulsion catalyst system, the tube was charged with 2.7 grams of 5,5,5-trifluoropentadiene-1,3 and 2.3 grams of 1,1-difluoro-2-methyl butadiene to make up a total monomer charge comprising 50 mol percent of each monomer. The copolymerization reaction was carried out under autogenous conditions of pressure at a temperature of 50° C. for a period of 24 hours. The resultant elastomeric product was worked-up in accordance with the same procedure as set forth in Example XIV. A rubbery product was obtained and, upon analysis, was found to comprise approximately 65 mol percent of 1,1-difluoro-2-methyl butadiene and the remaining major constituent being 5,5,5-trifluoropentadiene-1,3. The copolymer was obtained in an amount corresponding to an 80% conversion. The Gehman stiffness data, after molding was as follows: $T_2=18°$ C.; $T_5=14°$ C.; $T_{10}=11.5°$ C.; $T_{100}=5°$ C.

Example XVI

This example illustrates the copolymerization of 1,1,2,4,4-pentafluoro-3-methyl butadiene and fluoroprene to produce an elastomeric copolymer.

A heavy-walled glass polymerization tube was flushed with nitrogen and was then charged with 1 ml. of a solution containing 0.5 gram of borax and 0.04 gram of sodium meta-bisulfite dissolved in 20 ml. of water. The contents of the tube were then frozen and the tube was charged with 5 ml. of a soap solution comprising 5 grams of potassium stearate (KORR soap) as an emulsifier; and 0.2 gram of dodecyl mercaptan dissolved in 100 ml. of water. The pH of the resultant mixture was adjusted with potassium hydroxide to 10. The contents of the tube were then refrozen and the tube was then charged with 4 ml. of a catalyst solution comprising 1.0 gram of potassium persulfate dissolved in 80 ml. of water. The tube was next connected to a gas-transfer system and evacuated at liquid nitrogen temperature. To the frozen contents of the tube were added, by distillation, 3.44 grams of 1,1,2,4,4-pentafluoro-3-methyl butadiene and 1.56 grams of fluoroprene, which comprised a 50/50 molar ratio. The 1,1,2,4,4-pentafluoro-3-methyl butadiene was prepared as follows: 1,2-dichloro-2-iodo-1,1,2-trifluoroethane, $CF_2ClCFClI$, prepared by the addition of iodine monochloride (ICl) to $CF_2=CFCl$, was added to 1,1-difluoropropene to yield the adduct,

which upon treatment with KOH yielded

The latter compound was then dechlorinated using zinc in propanol to produce

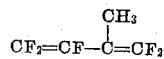

B.P. 47° C. 1,1-difluoropropene was prepared as follows:

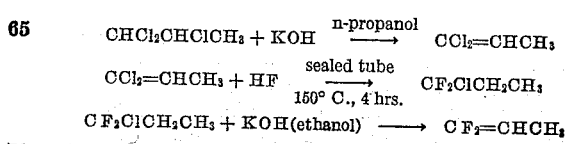

The polymerization tube was next sealed and rotated end-over-end in a temperature-regulated water-bath at 50° C. The polymerization was conducted under autogenous pressure at 50° C. for a period of 26 hours. The polymer latex thus obtained was coagulated by freezing at liquid nitrogen temperature. The coagulated product was collected, washed with hot water and dried to constant weight in vacuo at 35° C. A soft, snappy rubber was obtained which was found, upon analysis, to comprise approximately 13 mol percent of 1,1,2,4,4-pentafluoro-3-methyl butadiene and the remaining major constituent being fluoroprene. The copolymer was obtained in an amount corresponding to a 27% conversion.

A sample of the raw copolymer was compression molded at 250° F. for 5 minutes. After molding, the sample remained as a soft rubber. A volume increase of 108.4% was obtained in ASTM type II fuel. The Gehman stiffness data was as follows: $T_2 = -19°$ C.; $T_5 = -28.5°$ C.; $T_{10} = -32°$ C.; $T_{100} = -42°$ C.

*Example XVII*

This example illustrates the copolymerization of 1,1,2,4,4-pentafluoro-3-methyl butadiene and 1,1,2-trifluoropentadiene-1,4 to produce an elastomeric copolymer.

Employing the procedure set forth in Example XVI and the same emulsion catalyst system, the tube was charged with 2.82 grams of 1,1,2,4,4-pentafluoro-3-methyl butadiene and 2.18 grams of 1,1,2-trifluoropentadiene-1,4 to make up a total monomer charge comprising 50 mol percent of each monomer. The 1,1,2-trifluoropentadiene-1,4 is prepared as follows:

$CF_2BrCFClBr + CH_2=CHCH_2Cl \longrightarrow$

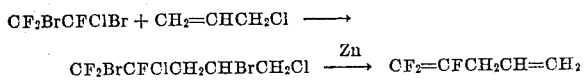

The copolymerization reaction was carried out under autogenous conditions of pressure at a temperature of 50° C. for a period of 22 hours. The resultant elastomeric product was worked-up in accordance with the same procedure as set forth in Example XVI. A rubbery product was obtained and, upon analysis, was found to comprise approximately 60 mol percent of 1,1,2,4,4-pentafluoro-3-methyl butadiene and the remaining major constituent being 1,1,2-trifluoropentadiene-1,4. The copolymer was obtained in an amount corresponding to a 2% conversion.

*Example XVIII*

This example illustrates the copolymerization of perfluorobutadiene and 1,1,3-trifluoro-2-methyl butadiene to produce an elastomeric copolymer.

A heavy-walled glass polymerization tube was flushed with nitrogen and then was charged with 9 ml. of a soap solution prepared by dissolving 3.0 grams of $C_7F_{15}COONH_4$, 0.05 gram of dodecyl mercaptan, 0.25 gram borax, 0.2 gram of sodium metabisulfite in 80 ml. of water and adding 10 ml. of concentrated buffer solution comprised of sodium diphosphate (20 grams) dissolved in 80 ml. of water. The contents of the tube were frozen in a liquid nitrogen bath, and to the tube was then added 1 ml. of a catalyst solution comprising 1.0 gram of potassium persulfate dissolved in 20 ml. of water. The contents of the tube were refrozen and the tube was connected to a gas-transfer system and evacuated. To the frozen contents of the tube were next added 2.15 grams of perfluorobutadiene and 2.85 grams of 1,1,3-trifluoro-2-methyl-1,3-butadiene which comprised a 50/50 molar ratio.

The polymerization tube was then sealed and rotated end-over-end in a temperature-regulated water-bath at 50° C. The polymerization was conducted under autogenous pressure at 50° C. for a period of 24 hours. The polymer latex thus obtained was next coagulated by freezing at liquid nitrogen temperature. The coagulated product was then collected, washed with hot water and dried to constant weight in vacuo at 35° C. A rubbery product was obtained which was found, upon analysis, to comprise approximately 25 mol percent of perfluorobutadiene and the remaining major constituent being 1,1,3-trifluoro-2-methyl butadiene. The copolymer was obtained in an amount corresponding to a 22% conversion.

As previously indicated, the elastomeric copolymers of the present invention possess highly desirable chemical and physical properties which makes them useful for the fabrication of a wide variety of rubber-like articles or for application to various surfaces as protective coatings. In such uses, the raw elastomeric copolymer can be pressed into sheets at temperatures between about 250° F. and about 350° F. and at a pressure between about 500 and about 1500 pounds per square inch, for a period of about 10 to about 60 minutes, from which various articles, such as gaskets, diaphragms, etc., can be fabricated. In this respect, it should be noted that the raw copolymer may also include various vulcanizing agents and fillers, if so desired.

When employed as protective coatings on any of the surfaces previously described, the raw elastomeric copolymer is dissolved in any of the aforementioned solvents, and is applied to the desired surface employing such apparatus as a knife spreader or a doctor-blade or a reverse-roll coater. The solvent, after the elastomeric coating composition has been applied to the surface, is permitted to evaporate. This may also be accomplished in the presence of elevated temperatures. After the solvent has been completely evaporated, the coated surface is now ready for use. In this respect, it should also be noted that the copolymeric coating composition may be applied to the surface either as a single coat, or if so desired, the protective coating may be built-up by the application of several layers, each layer being permitted to harden by solvent evaporation before the next layer is applied. Furthermore, if so desired, the protective coatings, or the elastomeric copolymer, when obtained in the form of sheets, may be suitably pigmented.

Since certain changes may be made in carrying out the process of the present invention in producing the desired elastomeric copolymers without departing from the scope of the invention, it is intended that all matter contained in the above description is to be interpreted as illustrative and not in a limiting sense.

We claim:

1. A process which comprises copolymerizing a member of the group consisting of 1,1-difluoro-2-methyl butadiene and 1,1-difluoro-3-methyl butadiene with a different diene selected from the group consisting of perfluorobutadiene, 1,1-difluorobutadiene, 1,1-difluoro-2-methyl butadiene, and 5,5,5-trifluoropentadiene, at a temperature between about 0° C. and about 90° C. in contact with a peroxy compound as a promoter to produce an elastomeric copolymer containing between about 5 and about 95 mol percent of each of said dienes.

2. The process of claim 1 in which the polymerization temperature is between about 25° C. and about 50° C.

3. The process of claim 1 in which the different diene is perfluorobutadiene.

4. The process of claim 1 in which the different diene is 1,1-difluorobutadiene.

5. The process of claim 1 in which the different diene is 1,1-difluoro-2-methyl butadiene.

6. The process of claim 1 in which the different diene is 5,5,5-trifluoropentadiene.

7. An elastomeric copolymer consisting essentially of a member of the group consisting of 1,1-difluoro-2-methyl butadiene and 1,1-difluoro-3-methyl butadiene and between about 5 and about 95 mol percent of a different diene selected from the group consisting of perfluorobutadiene, 1,1-difluoro-butadiene, 1,1-difluoro-2-methyl butadiene, and 5,5,5-trifluoropentadiene.

8. The elastomeric copolymer of claim 7 in which the different diene is perfluorobutadiene.

9. The elastomeric copolymer of claim 7 in which the different diene is 1,1-difluorobutadiene.

10. The elastomeric copolymer of claim 7 in which the different diene is 1,1-difluoro-2-methyl butadiene.

11. The elastomeric copolymer of claim 7 in which the different diene is 5,5,5-trifluoropentadiene.

12. A process which comprises copolymerizing 1,1-difluoro-3-methyl butadiene and 1,1-difluorobutadiene to produce a copolymer containing between about 5 mole percent and about 95 mole percent of each said dienes.

13. A copolymerization product of 1,1-difluoro-3-methyl butadiene and 1,1-difluorobutadiene containing between about 5 mole percent and about 95 mole percent of each diene.

References Cited in the file of this patent

UNITED STATES PATENTS

| 2,742,454 | Rearick et al. | Apr. 17, 1956 |
| 2,750,431 | Tarrant et al. | June 12, 1956 |

OTHER REFERENCES

Tarrant, "Journal of American Chemical Society," vol. 76, pages 2343 to 2345, May 5, 1954. (Copy in Sci. Lib.)